United States Patent
Kline et al.

(10) Patent No.: US 10,833,963 B2
(45) Date of Patent: Nov. 10, 2020

(54) ADDING A RECOMMENDED PARTICIPANT TO A COMMUNICATION SYSTEM CONVERSATION

(71) Applicant: International Business Machines Corporation, Armonk, NY (US)

(72) Inventors: Eric V. Kline, Rochester, MN (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 58 days.

(21) Appl. No.: 16/128,729

(22) Filed: Sep. 12, 2018

(65) Prior Publication Data

US 2020/0084123 A1 Mar. 12, 2020

(51) Int. Cl.
G06F 15/16 (2006.01)
H04L 12/24 (2006.01)
H04L 12/58 (2006.01)

(52) U.S. Cl.
CPC ........ *H04L 41/5064* (2013.01); *H04L 41/026* (2013.01); *H04L 51/04* (2013.01)

(58) Field of Classification Search
CPC .... H04L 41/5064; H04L 41/026; H04K 51/04
USPC ...................................................... 709/206
See application file for complete search history.

(56) References Cited

U.S. PATENT DOCUMENTS

| | | | | |
|---|---|---|---|---|
| 9,177,283 B2* | 11/2015 | Singh | ...................... | G06Q 10/10 |
| 9,602,444 B2* | 3/2017 | Hawker | .............. | G06F 16/9038 |
| 10,423,948 B1* | 9/2019 | Wilson | .................... | G06Q 20/42 |
| 2007/0016563 A1* | 1/2007 | Omoigui | ................. | G06F 16/90 |
| 2009/0006549 A1* | 1/2009 | Singh | ...................... | G06Q 10/10 709/204 |
| 2009/0307319 A1* | 12/2009 | Dholakia | ............ | H04L 12/1822 709/206 |
| 2010/0015975 A1* | 1/2010 | Issa | ................... | H04W 12/0804 455/435.1 |
| 2010/0015976 A1* | 1/2010 | Issa | ..................... | G06F 21/6263 455/435.1 |
| 2010/0268681 A1* | 10/2010 | Guo | ....................... | G06Q 10/10 706/54 |

(Continued)

*Primary Examiner* — Imad Hussain
(74) *Attorney, Agent, or Firm* — Cantor Colburn LLP; Tihon Poltavets

(57) ABSTRACT

Examples of techniques for adding a recommended participant to a communication system conversation are disclosed. In one example implementation according to aspects of the present disclosure, a computer-implemented method includes monitoring, by a processing device, a conversation between participants that are using a communication system. The method further includes determining, by the processing device, a knowledge gap in the conversation between participants based at least in part on analyzing content of the conversation. The method further includes selecting, by the processing device, a recommended participant to add to the conversation, the recommended participant being selected based at least in part on the knowledge gap. The method further includes establishing, by the processing device, a connection between the communication system and a user device associated with the recommended participant to add the recommended participant to the conversation.

17 Claims, 7 Drawing Sheets

(56) References Cited

U.S. PATENT DOCUMENTS

| | | | |
|---|---|---|---|
| 2011/0184926 A1* | 7/2011 | Lee | G06F 16/334 |
| | | | 707/706 |
| 2011/0246910 A1* | 10/2011 | Moxley | G06F 16/951 |
| | | | 715/758 |
| 2011/0320373 A1* | 12/2011 | Lee | H04L 67/14 |
| | | | 705/319 |
| 2012/0290950 A1* | 11/2012 | Rapaport | H04N 21/8358 |
| | | | 715/753 |
| 2013/0151240 A1* | 6/2013 | Myslinski | G06Q 10/10 |
| | | | 704/9 |
| 2013/0158984 A1* | 6/2013 | Myslinski | G06F 16/951 |
| | | | 704/9 |
| 2013/0297317 A1 | 11/2013 | Lee et al. | |
| 2013/0332537 A1 | 12/2013 | Emerick et al. | |
| 2014/0164305 A1 | 6/2014 | Lynch et al. | |
| 2014/0195931 A1* | 7/2014 | Kwon | G06Q 30/02 |
| | | | 715/753 |
| 2014/0379729 A1* | 12/2014 | Savage | H04L 51/14 |
| | | | 707/748 |
| 2015/0181020 A1* | 6/2015 | Fitzsimmons | H04M 3/42221 |
| | | | 379/67.1 |
| 2015/0195220 A1* | 7/2015 | Hawker | G06F 16/90324 |
| | | | 709/206 |
| 2015/0254748 A1* | 9/2015 | Gao | G06Q 30/0605 |
| | | | 705/26.44 |
| 2015/0319113 A1* | 11/2015 | Gunderson | H04L 65/1083 |
| | | | 715/753 |
| 2017/0076205 A1 | 3/2017 | Arora et al. | |
| 2018/0102989 A1* | 4/2018 | Borsutsky | G06F 40/35 |
| 2018/0295081 A1* | 10/2018 | McGregor, Jr. | G06K 9/726 |

* cited by examiner

ADDING A RECOMMENDED PARTICIPANT TO A COMMUNICATION SYSTEM CONVERSATION

BACKGROUND

The present invention generally relates to communication systems, and more specifically, to adding a recommended participant to a communication system conversation.

Communication systems enable participants to communicate, such as by exchanging text, audio, video, and other media. Communication systems utilize communications networks, transmission systems, relay stations, tributary stations, data terminal equipment, and the like to enable communication between participants.

SUMMARY

Embodiments of the present invention are directed to a computer-implemented method for adding a recommended participant to a communication system conversation. A non-limiting example of the computer-implemented method includes monitoring, by a processing device, a conversation between participants that are using a communication system. The method further includes determining, by the processing device, a knowledge gap in the conversation between participants based at least in part on analyzing content of the conversation. The method further includes selecting, by the processing device, a recommended participant to add to the conversation, the recommended participant being selected based at least in part on the knowledge gap. The method further includes establishing, by the processing device, a connection between the communication system and a user device associated with the recommended participant to add the recommended participant to the conversation.

Embodiments of the present invention are directed to a system. A non-limiting example of the system includes a memory comprising computer readable instructions and a processing device for executing the computer readable instructions for performing a method for adding a recommended participant to a communication system conversation.

Embodiments of the invention are directed to a computer program product. A non-limiting example of the computer program product includes a computer readable storage medium having program instructions embodied therewith. The program instructions are executable by a processor to cause the processor to perform a method for adding a recommended participant to a communication system conversation.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
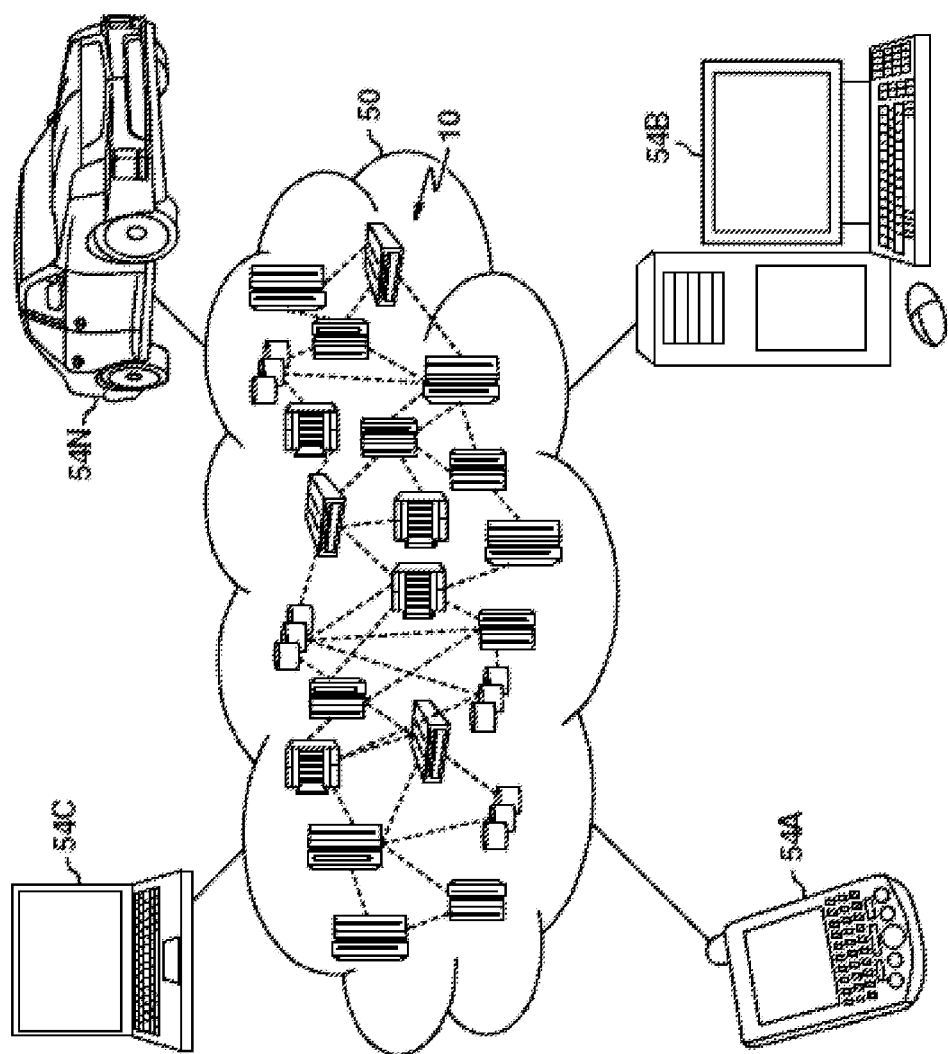
FIG. 1 depicts a cloud computing environment according to aspects of the present disclosure.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that, although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
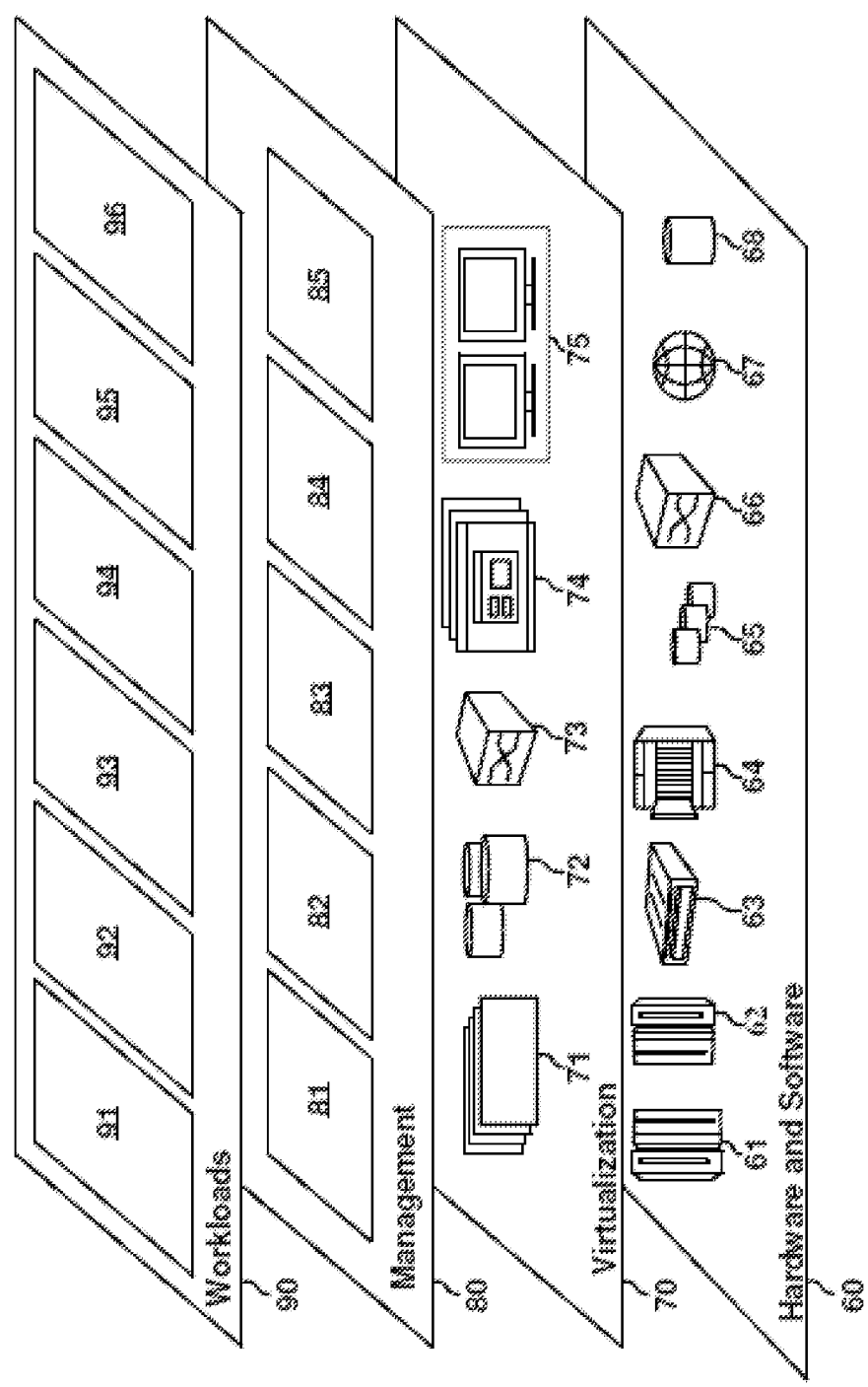
FIG. 2 depicts abstraction model layers according to aspects of the present disclosure.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and dynamically adding a participant to a communication system 96.

Figure 3:
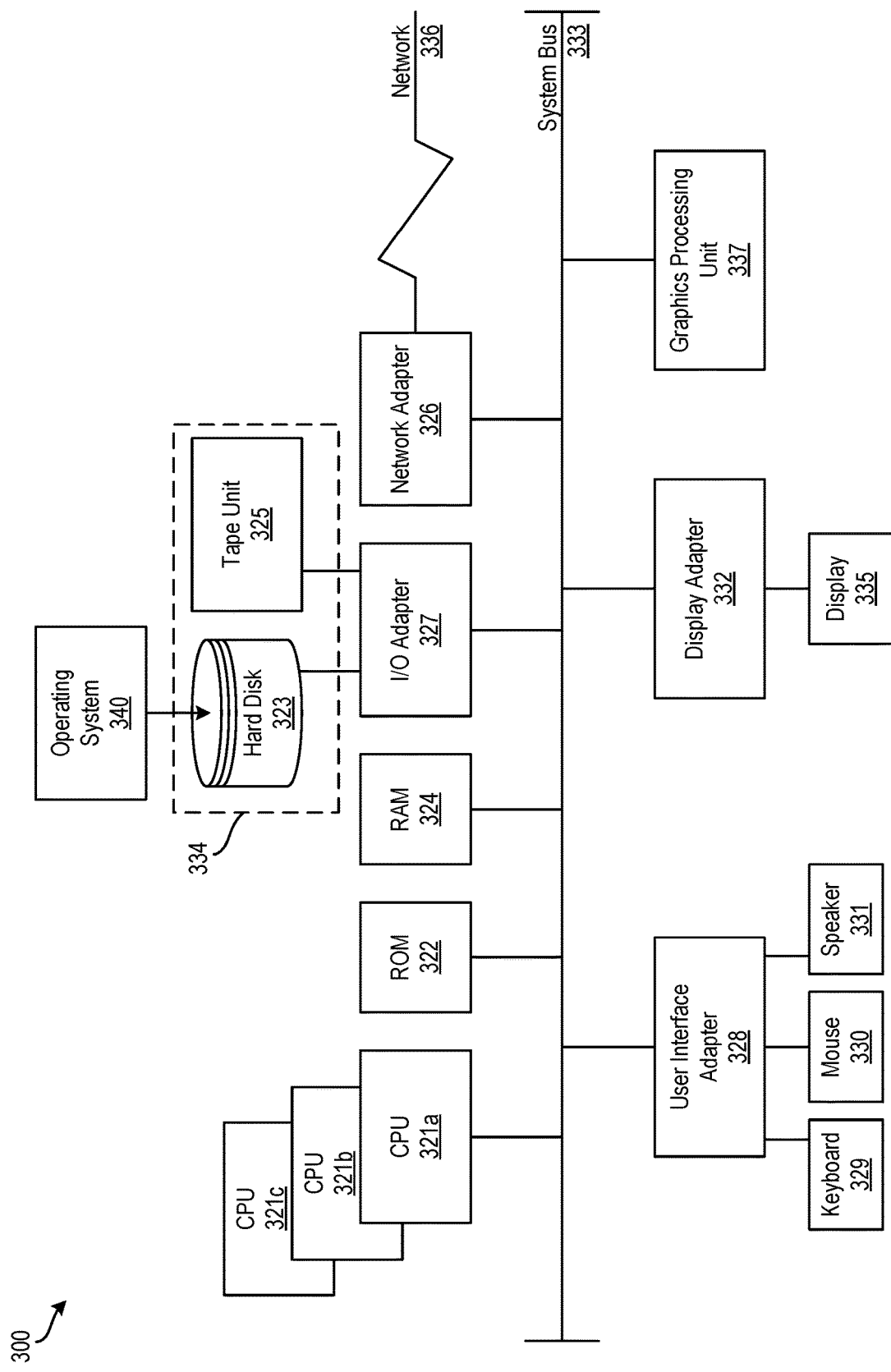
FIG. 3 depicts a block diagram of a processing system for implementing the techniques described herein according to aspects of the present disclosure.

It is understood that the present disclosure is capable of being implemented in conjunction with any other type of computing environment now known or later developed. For example, FIG. 3 depicts a block diagram of a processing system 300 for implementing the techniques described herein. In examples, processing system 300 has one or more central processing units (processors) 321a, 321b, 321c, etc. (collectively or generically referred to as processor(s) 321 and/or as processing device(s) 321). In aspects of the present disclosure, each processor 321 can include a reduced instruction set computer (RISC) microprocessor. Processors 321 are coupled to system memory (e.g., random access memory (RAM) 324) and various other components via a system bus 333. Read only memory (ROM) 322 is coupled to system bus 333 and may include a basic input/output system (BIOS), which controls certain basic functions of processing system 300.

Further depicted are an input/output (I/O) adapter 327 and a network adapter 326 coupled to system bus 333. I/O adapter 327 may be a small computer system interface (SCSI) adapter that communicates with a hard disk 323 and/or a tape storage drive 325 or any other similar component. I/O adapter 327, hard disk 323, and tape storage device 325 are collectively referred to herein as mass storage 334. Operating system 340 for execution on processing system 300 may be stored in mass storage 334. The network adapter 326 interconnects system bus 333 with an outside network 336 enabling processing system 300 to communicate with other such systems.

A display (e.g., a display monitor) 335 is connected to system bus 333 by display adapter 332, which may include a graphics adapter to improve the performance of graphics intensive applications and a video controller. In one aspect of the present disclosure, adapters 326, 327, and/or 232 may be connected to one or more I/O busses that are connected to system bus 333 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 333 via user interface adapter 328 and display adapter 332. A keyboard 329, mouse 330, and speaker 331 may be interconnected to system bus 333 via user interface adapter 328, which may include, for example, a Super I/O chip integrating multiple device adapters into a single integrated circuit.

In some aspects of the present disclosure, processing system 300 includes a graphics processing unit 337. Graphics processing unit 337 is a specialized electronic circuit designed to manipulate and alter memory to accelerate the creation of images in a frame buffer intended for output to a display. In general, graphics processing unit 337 is very efficient at manipulating computer graphics and image processing, and has a highly parallel structure that makes it more effective than general-purpose CPUs for algorithms where processing of large blocks of data is done in parallel.

Thus, as configured herein, processing system 300 includes processing capability in the form of processors 321, storage capability including system memory (e.g., RAM 324), and mass storage 334, input means such as keyboard 329 and mouse 330, and output capability including speaker 331 and display 335. In some aspects of the present disclosure, a portion of system memory (e.g., RAM 324) and mass storage 334 collectively store an operating system such as the AIX® operating system from IBM Corporation to coordinate the functions of the various components shown in processing system 300.

Turning now to an overview of technologies that are more specifically relevant to aspects of the invention, communication systems enable individuals to connect to one another on a real-time basis and share content, such as text, audio, video, and other media. In general, individuals can communicate with one another directly (e.g., one individual to another individual) or within a group (e.g., between multiple individuals). When content is shared within a group, for example, the members of the group receive the content.

Sometimes, during the course of a conversation, participants can have a disagreement, misunderstanding, or argument, or in other cases, the participants may not have sufficient information, such as to answer a question posed by another participant. Often times, a technical problem arises that is unique to electronic or online communication systems: participants in a conversation are not face-to-face and are instead communicating in writing via text message, group chat, etc. In such cases, it is easy for misunderstanding and/or misinterpretation to occur. In the case where two participants are having an argument, it may be helpful to involve another participant in the conversation to mediate between the two friends, to clarify a fact or miscommunication, etc. In the digital realm, it may not be obvious or apparent to others that two participants are having a disagreement.

Turning now to an overview of the aspects of the invention, one or more embodiments of the invention address the above-described shortcomings of the prior art by providing techniques for automatically adding a recommended participant to a communication system conversation. To do this, the technical solutions described herein monitor a conversation between participants that are using a communication system. A knowledge gap in the conversation between participants is then determined based at least in part on analyzing the content of the conversation. A knowledge gap represents unknown or misinformation in a conversation. For example, if two participants are discussing a football game, and one participant asks the score of the football game and the other participant does not know, a knowledge gap exists regarding what the score of the football game is. The present techniques further provide for selecting a recommended participant to add to the conversation. The recommended participant is selected based at least in part on the knowledge gap. Finally, the recommended participant is added to the conversation via the communication system.

Example embodiments of the disclosure include or yield various technical features, technical effects, and/or improvements to technology. The above-described aspects of the invention address the shortcomings of the prior art by improving communication systems by identifying knowledge gaps in conversations and determining a recommended participant to add to the conversation to provide clarity, mediation, additional information, etc. to the conversation. For example, the present techniques can be used to improve online or digital communication-based conversation occurring in an electronic communication system by involving other participants (i.e., a recommended participant) to mediate disagreements, provide additional details/information, etc., such as when two participants are experiencing a disagreement. The recommended participant can be selected to specifically fill a knowledge gap between other participants, resulting in improved conversation. These aspects of the disclosure constitute technical features that yield the technical effect of adding a participant to a conversation in a communication system in order to fill a knowledge gap between other participants. As a result of these technical features and technical effects, the technical solutions described herein represent an improvement to existing communication systems. It should be appreciated that the above examples of technical features, technical effects, and improvements to the technology of example embodiments of the disclosure are merely illustrative and not exhaustive.

Figure 4:
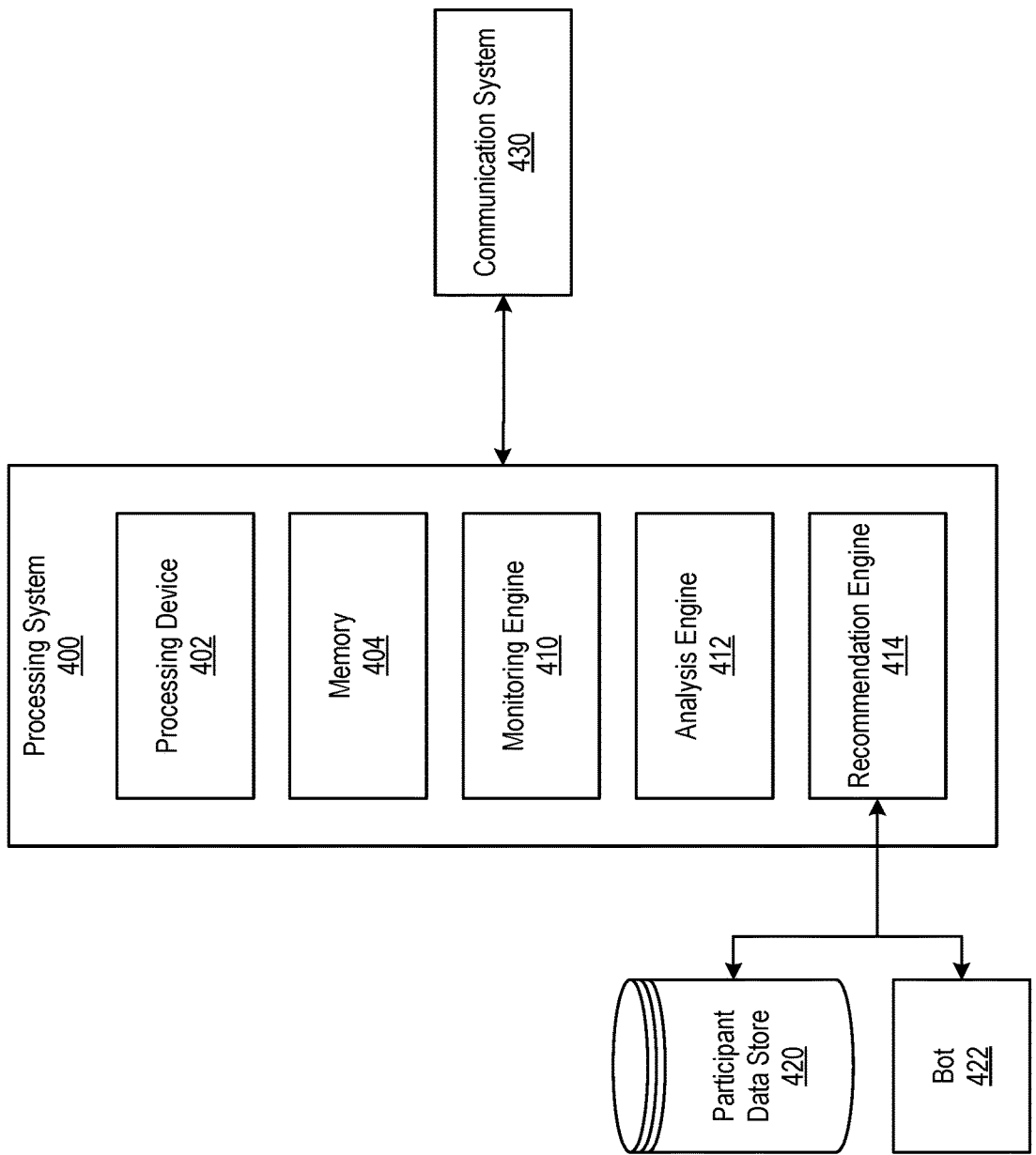
FIG. 4 depicts a block diagram of a processing system for adding a participant to a conversation occurring via a communication system according to one or more embodiments described herein.

Turning now to a more detailed description of aspects of the present invention, FIG. 4 depicts a block diagram of a processing system 400 for adding a participant to a conversation occurring via a communication system 430 according to one or more embodiments described herein. The processing system 400 includes a processing device 402, a memory 404, a monitoring engine 410, an analysis engine 412, and a recommendation engine 414.

Generally, the monitoring engine 410 monitors a conversation between participants that are using a communication system. The analysis engine 412 determines a knowledge gap in the conversation between participants based at least in part on analyzing the content of the conversation. The recommendation engine 414 selects a recommended participant to add to the conversation, the recommended participant being selected based at least in part on the knowledge gap, and adds the recommended participant to the conversation via the communication system 430. The recommended participant can be selected based on data about potential participants stored in a participant data store 420. The recommended participant can also be a virtual participant or "bot" 422. These components and their respective functionalities are described in more detail with reference to FIGS. 5, 6, and 7.

The various components, modules, engines, etc. described regarding FIG. 4 can be implemented as instructions stored on a computer-readable storage medium, as hardware modules, as special-purpose hardware (e.g., application specific hardware, application specific integrated circuits (ASICs), application specific special processors (ASSPs), field programmable gate arrays (FPGAs), as embedded controllers, hardwired circuitry, etc.), or as some combination or combinations of these. According to aspects of the present disclosure, the engine(s) described herein can be a combination of hardware and programming. The programming can be processor executable instructions stored on a tangible memory, and the hardware can include the processing device 402 for executing those instructions. Thus a system memory (e.g., memory 404) can store program instructions that when executed by the processing device 402 implement the engines described herein. Other engines can also be utilized to include other features and functionality described in other examples herein.

Figure 5:
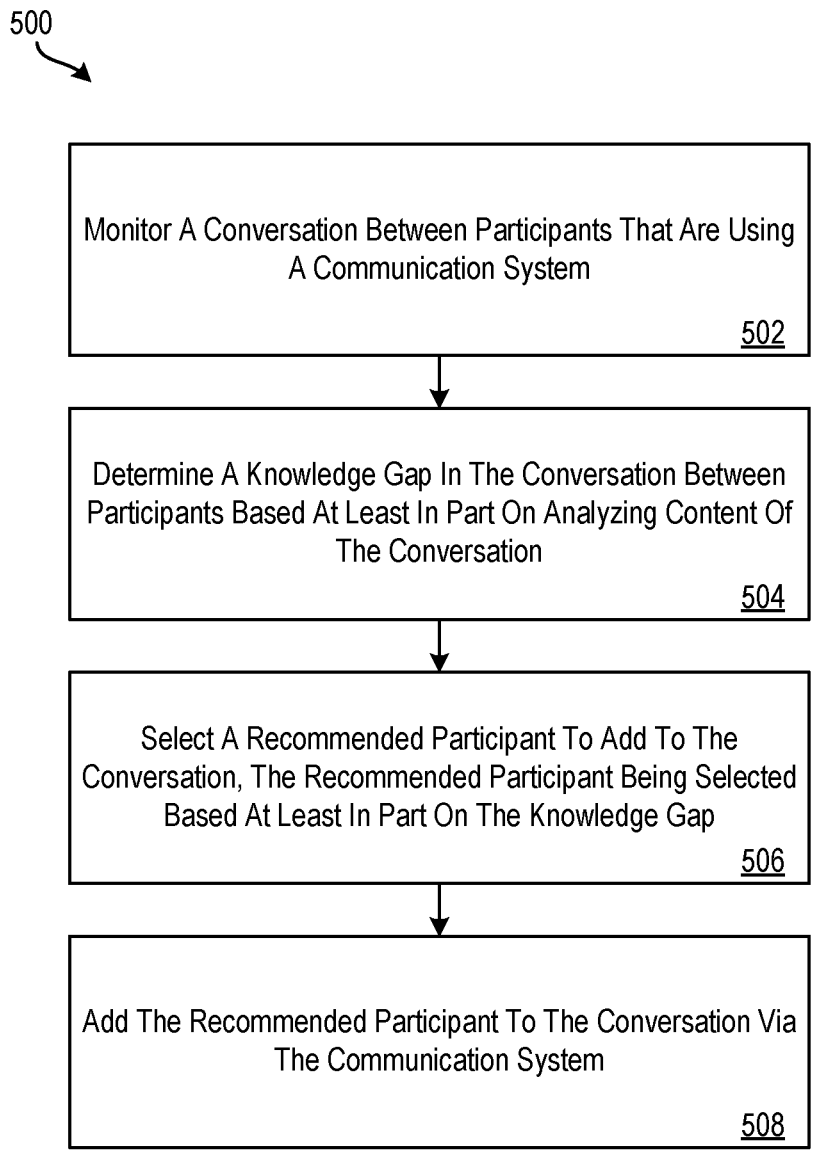
FIG. 5 depicts a flow diagram of a method for adding a participant to a conversation occurring via a communication system according to one or more embodiments described herein.

FIG. 5 depicts a flow diagram of a method 500 for adding a participant to a conversation occurring via a communication system according to one or more embodiments described herein. The method 500 can be implemented using any suitable processing system (e.g., the cloud computing environment 50, the processing system 300, the processing system 400, etc.) and/or processing device (e.g., the processing device 321, the processing device 402, etc.). The steps of the method 500 are now described with reference to the processing system 400.

At block 502, the monitoring engine 410 monitors a conversation between participants that are using the communication system 430. The communication system 430 can be any suitable communication system, such as a text messaging system, an instant messaging/chat system, and the like.

At block 504, the analysis engine 412 determines a knowledge gap in the conversation between participants based at least in part on analyzing the content of the conversation. A knowledge gap represents unknown or misinformation in a conversation. For example, if two participants are discussing a football game, and one participant asks the score of the football game and the other participant does not know, a knowledge gap exists regarding what the score of the football game is. In such situations, an additional participant can be added to fill the knowledge gap. Indicators that may be used to determine a knowledge gap are when a participant asks a question, when a participant expresses confusion, when a statement is incorrect (which can be determined by comparing statements to databases of information), etc.

At block 506, the recommendation engine 414 selects a recommended participant to add to the conversation. The recommended participant is selected based at least in part on the knowledge gap. For example, the recommended participant is selected based on the recommended participant's ability to provide information useful for filling the knowledge gap. The recommended participant can be selected from a plurality of potential participants. According to one or more embodiments described herein, each potential participant of the plurality of potential participants has an existing relationship (e.g., friend, business colleague, client, etc.) with at least one of the participants of the conversation. The existing relationship can be determined based, for example, on a connection between a participant and a potential participant on a social networking service (e.g., a potential participant is "friends" with one of the participants). In some examples, a potential participant that is mutually connected to the other participants may be selected over a potential participant that is not mutually connected to the other participants. For example, a potential participant may be "friends" with both participants in a conversation.

According to one or more embodiments described herein, the recommended participant is a virtual participant or "bot" (e.g., the bot 422) that can participate in the conversation. The virtual participant can utilize artificial intelligence to analyze the content of the conversation and provide a response based on the analysis of the content. For example, the bot 422 can recognize the knowledge gap and determine a suitable response to help fill in the knowledge gap. For instance, if two participants are discussing the weather, the bot 422, being configured with weather capabilities, can provide weather information, such as a forecast or historical weather information.

According to one or more embodiments described herein, the recommendation engine 414 can present an authorization option to the participants to enable the participants to select whether to add the recommended participant to the conversation. This can occur prior to adding the recommended participant to the conversation. In such cases, subsequent to at least one of the participants selecting to add the recommended participant to the conversation, the recommendation engine 414 can cause the recommended participant to be added to the conversation via the communication system 430. If one or more of the participants selects not to add the recommended participant to the conversation, the recommendation engine 414 does not cause the communication system 430 to add the recommended participant and can further suggest a different potential participant to be added to the conversation.

At block 508, the recommendation engine 414 causes the recommended participant to be added to the conversation via the communication system 430. This can include adding the recommended participant to a group text or chat session between the participants and the recommended participant. The recommended participant can be notified that he/she is being added to the conversation and, in some examples, can elect whether or not to participate in the conversation. According to one or more embodiments described herein, the recommendation engine 414 (or another suitable engine) establishes a connection between the communication system 430 and a user device (not shown) associated with the recommended participant to add the recommended participant to the conversation Additional processes also may be included. For example, the method 500 can be iterative. That is, the method 500 can repeat to determine other knowledge gaps after a recommended participant has been added. For example, subsequent to adding the recommended participant to the conversation, the monitoring engine 410 monitors the conversation between participants and the recommended participant using the communication system 430. The analysis engine 412 then determines a second knowledge gap in the conversation between participants and the recommended participant based at least in part on analyzing the content of the conversation. The recommendation engine 414 selects a second recommended participant to add to the conversation. The second recommended participant is selected based at least in part on the second knowledge gap. The recommendation engine 414 then adds the second recommended participant to the conversation via the communication system 430.

It should be understood that the process depicted in FIG. 5 represents an illustration, and that other processes may be added or existing processes may be removed, modified, or rearranged without departing from the scope and spirit of the present disclosure.

Figure 6:
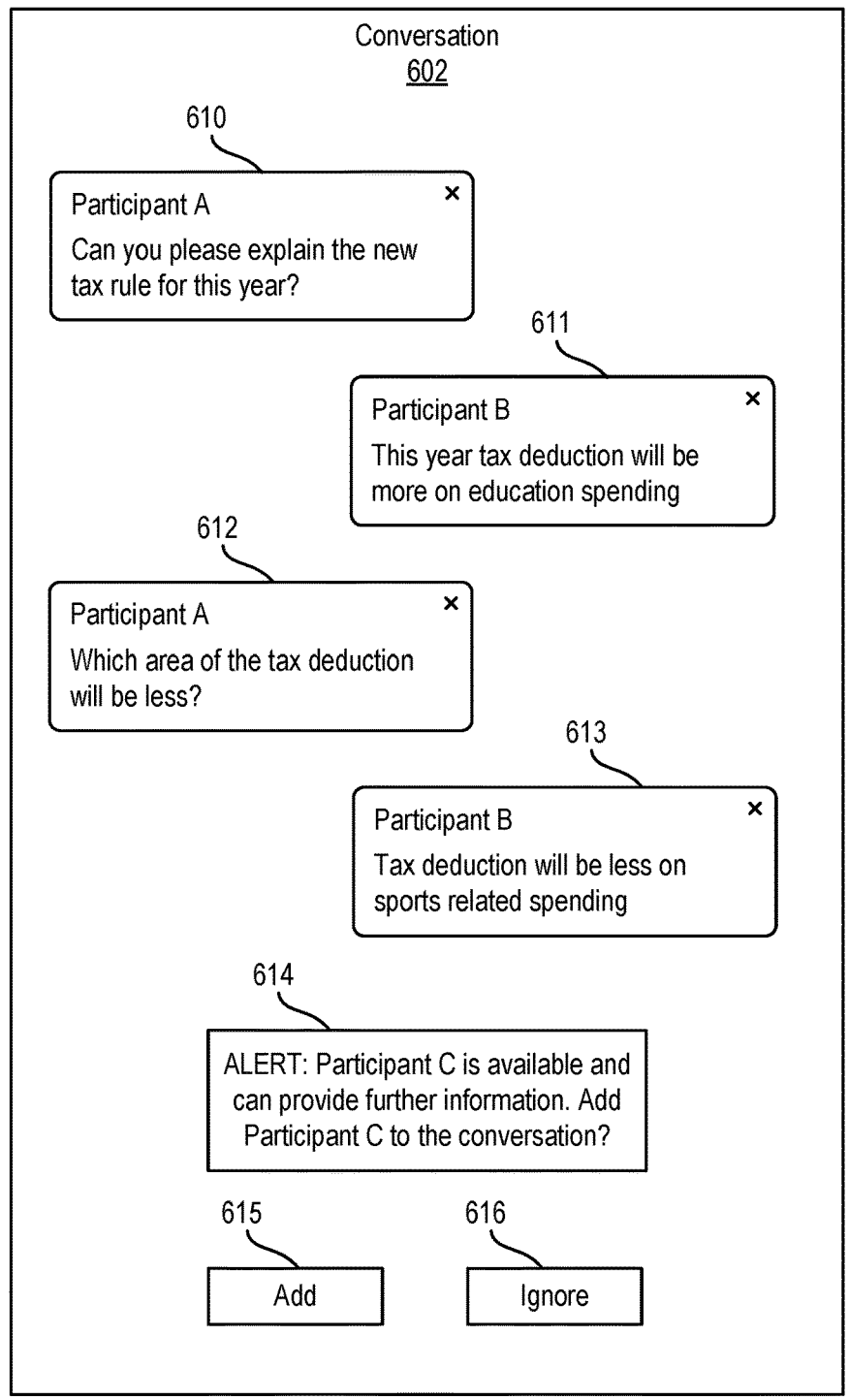
FIG. 6 depicts a user interface of a conversation between two participants according to one or more embodiments described herein.

FIG. 6 depicts a user interface 600 of a conversation 602 between two participants according to one or more embodiments described herein. The monitoring engine 410 monitors the conversation between Participant A and Participant B, who are using the communication system 430. Participant A sends text 610 to Participant B asking "Can you please explain the new tax rule for this year?" Participant B responds with text 611 stating "This year tax deduction will be more on education spending." Participant A then asks, with text 612, "Which area of the tax deduction will be less?" Participant B response with text 613, stating "Tax deduction will be less on sports related spending."

The analysis engine 412 analyzes the content of the conversation (e.g., text 611, 612, 613) and determines that a knowledge gap exists in the conversation between Participant A and Participant B. Specifically, the analysis engine 412 determines that a knowledge gap exists with respect to new tax rules and what deductions have changed in the next tax rules. One way that the analysis engine 412 makes this determination is by identifying a subject or topic of discussion during the conversation (e.g., tax rules) and analyzing the content of the discussion to determine whether the participants remarks are accurate and/or whether a participant has a question (e.g., which area of the tax deduction will be less?). For example, the analysis engine 412 can compare the statements of text 611 and 613 against knowledge bases of information (e.g., such as a tax rule book, a tax discussion forum, Internet-based data, etc.) to determine whether the text 611 and/or 613 are accurate. If inaccurate, the analysis engine 412 may determine that a knowledge gap exists.

The recommendation engine 414 then selects a recommended participant to add to the conversation. In this example, the recommendation engine 414 selects Participant C, who may be an expert in the field of tax, tax law, accounting, etc. An alert 614 is issued in the conversation, such as by the recommendation engine 414, to alert Participant A and Participant B that "Participant C is available and can provide further information. Add Participant C to the conversation?" The recommendation engine 414, in conjunction with the communication system 430, prompts Participants A and B to either add Participant C (block 615) or reject Participant C (block 616). If one of Participants A or B selects to add Participant C, Participant C is added to the conversation 602 by the communication system 430.

Figure 7:
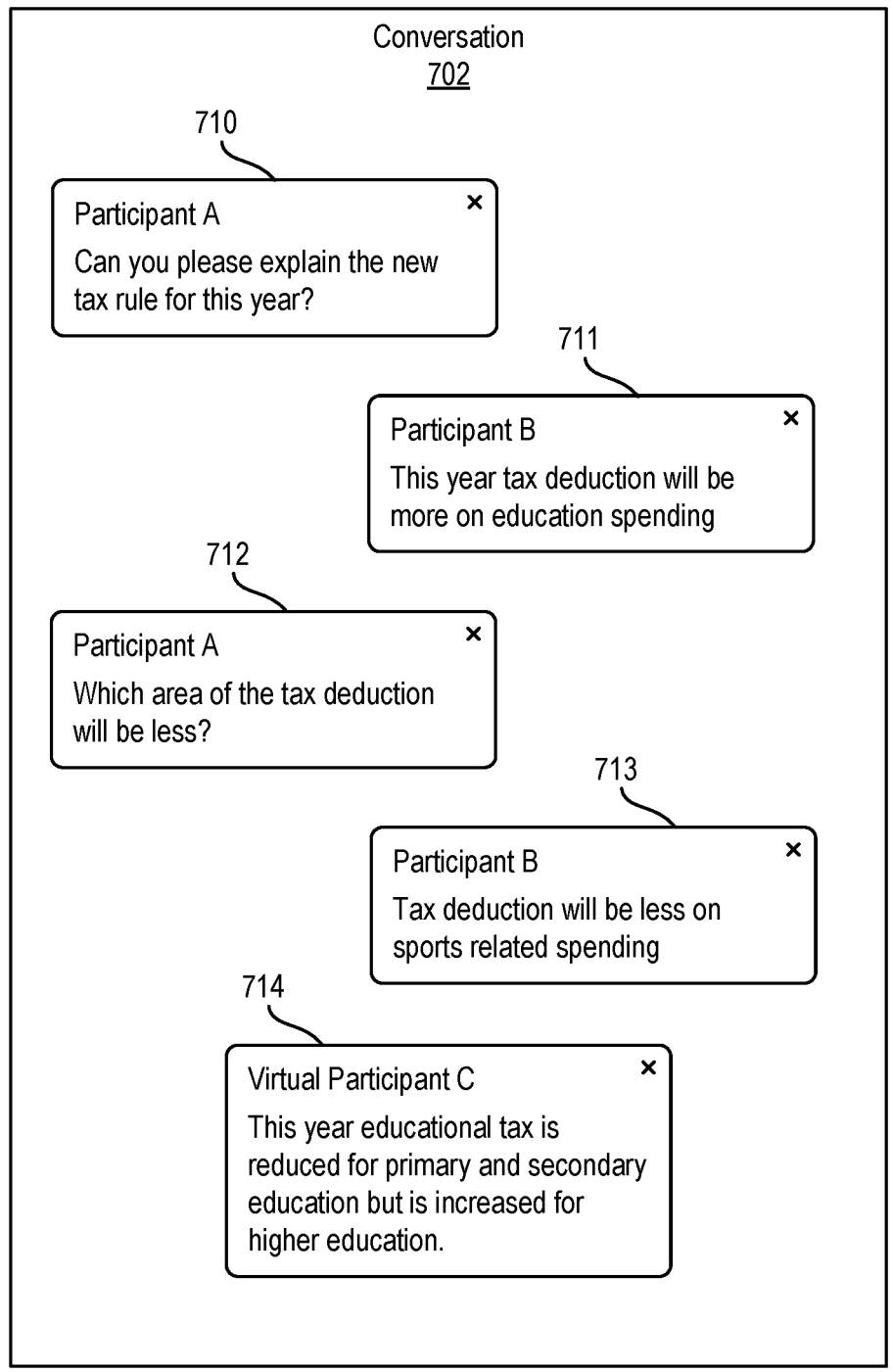
FIG. 7 depicts a user interface of a conversation between two participants according to one or more embodiments described herein.

FIG. 7 depicts a user interface 700 of a conversation 702 between two participants according to one or more embodiments described herein. This example particularly relates to adding a virtual participant or "bot" to the conversation 702.

In this example, the monitoring engine 410 monitors the conversation between Participant A and Participant B, who are using the communication system 430. Like the example of FIG. 6, in FIG. 7, Participant A sends text 710 to Participant B asking "Can you please explain the new tax rule for this year?" Participant B responds with text 711 stating "This year tax deduction will be more on education spending." Participant A then asks, with text 712, "Which area of the tax deduction will be less?" Participant B response with text 713, stating "Tax deduction will be less on sports related spending."

The analysis engine 412 analyzes the content of the conversation (e.g., text 711, 712, 713) and determines that a knowledge gap exists in the conversation between Participant A and Participant B. Specifically, the analysis engine 412 determines that a knowledge gap exists with respect to new tax rules and what deductions have changed in the next tax rules. One way that the analysis engine 412 makes this determination is by identifying a subject or topic of discussion during the conversation (e.g., tax rules) and analyzing the content of the discussion to determine whether the participants remarks are accurate and/or whether a participant has a question (e.g., which area of the tax deduction will be less?). For example, the analysis engine 412 can compare the statements of text 711 and 713 against knowledge bases of information (e.g., such as a tax rule book, a tax discussion forum, Internet-based data, etc.) to determine whether the text 711 and/or 713 are accurate. If inaccurate, the analysis engine 412 may determine that a knowledge gap exists.

The recommendation engine 414 then selects a recommended participant to add to the conversation. In this example, the recommendation engine 414 selects a Virtual Participant C, which may be a bot that has specialized knowledge in the field of tax, tax law, accounting, etc. The recommendation engine 414 can add the Virtual Participant C automatically to the conversation 702, and an alert 714 is issued in the conversation 702, stating "This year educational tax is reduced for primary and secondary education but is increased for higher education."

According to one or more embodiments described herein, the recommendation engine 414, in conjunction with the communication system 430, can prompt Participants A and B to remove Virtual Participant C if desired. If one of Participants A or B selects to remove Virtual Participant C, Virtual Participant C is removed from the conversation 702 by the communication system 430.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   monitoring, by a processing device, a conversation between participants that are using a communication system;
   determining, by the processing device, a knowledge gap in the conversation between participants based at least in part on analyzing content of the conversation, wherein determining the knowledge gap comprises detecting inaccurate information in the conversation;
   responsive to detecting the inaccurate information, selecting, by the processing device, a recommended participant to add to the conversation, the recommended participant being selected based at least in part on the inaccurate information;
   responsive to sending a notification to the recommended participant to query whether the recommended participant elects to participate in the conversation or elects to not participate in the conversation, receiving, by the processing device, an election from the recommended participant; and
   responsive to receiving the election from the recommended participant to participate in the conversation, establishing, by the processing device, a connection between the communication system and a user device associated with the recommended participant to add the recommended participant to the conversation,
   wherein the recommended participant is a virtual participant, the method further comprising:
   removing, by the processing device, the virtual participant from the conversation responsive to receiving a request from one or more of the participants to remove the virtual participant from the conversation.

2. The computer-implemented method of claim 1, wherein the recommended participant is selected from a plurality of potential participants.

3. The computer-implemented method of claim 2, wherein each potential participant of the plurality of potential participants has an existing relationship with at least one of the participants.

4. The computer-implemented method of claim 1, further comprising:
   prior to adding the recommended participant to the conversation, presenting an authorization option to the participants to enable the participants to select whether to add the recommended participant to the conversation.

5. The computer-implemented method of claim 4, further comprising:
   subsequent to at least one of the participants selecting to add the recommended participant to the conversation, adding the recommended participant to the conversation via the communication system.

6. The computer-implemented method of claim 1, further comprising, subsequent to adding the recommended participant to the conversation:
   monitoring, by the processing device, the conversation between participants and the recommended participant using the communication system;
   determining, by the processing device, a second knowledge gap in the conversation between participants and the recommended participant based at least in part on analyzing the content of the conversation;
   selecting, by the processing device, a second recommended participant to add to the conversation, the second recommended participant being selected based at least in part on the second knowledge gap; and establishing, by the processing device, a connection between the communication system and a second user device associated with the second recommended participant to add the second recommended participant to the conversation.

7. A system comprising:
a memory comprising computer readable instructions; and
a processing device for executing the computer readable instructions for performing a method comprising:
monitoring, by the processing device, a conversation between participants that are using a communication system;
determining, by the processing device, a knowledge gap in the conversation between participants based at least in part on analyzing content of the conversation, wherein determining the knowledge gap comprises detecting inaccurate information in the conversation;
responsive to detecting the inaccurate information, selecting, by the processing device, a recommended participant to add to the conversation, the recommended participant being selected based at least in part on the inaccurate information;
responsive to sending a notification to the recommended participant to query whether the recommended participant elects to participate in the conversation or elects to not participate in the conversation, receiving, by the processing device, an election from the recommended participant; and
responsive to receiving the election from the recommended participant to participate in the conversation, establishing, by the processing device, a connection between the communication system and a user device associated with the recommended participant to add the recommended participant to the conversation,
wherein the recommended participant is a virtual participant, the method further comprising:
removing, by the processing device, the virtual participant from the conversation responsive to receiving a request from one or more of the participants to remove the virtual participant from the conversation.

8. The system of claim 7, wherein the recommended participant is selected from a plurality of potential participants.

9. The system of claim 8, wherein each potential participant of the plurality of potential participants has an existing relationship with at least one of the participants.

10. The system of claim 7, wherein the method further comprises:
prior to adding the recommended participant to the conversation, presenting an authorization option to the participants to enable the participants to select whether to add the recommended participant to the conversation.

11. The system of claim 10, wherein the method further comprises:
subsequent to at least one of the participants selecting to add the recommended participant to the conversation, adding the recommended participant to the conversation via the communication system.

12. The system of claim 7, wherein the method further comprises, subsequent to adding the recommended participant to the conversation:
monitoring, by the processing device, the conversation between participants and the recommended participant using the communication system;
determining, by the processing device, a second knowledge gap in the conversation between participants and the recommended participant based at least in part on analyzing the content of the conversation;
selecting, by the processing device, a second recommended participant to add to the conversation, the second recommended participant being selected based at least in part on the second knowledge gap; and
establishing, by the processing device, a connection between the communication system and a second user device associated with the second recommended participant to add the second recommended participant to the conversation.

13. A computer program product comprising:
a computer readable storage medium having program instructions embodied therewith, the program instructions executable by a processing device to cause the processing device to perform a method comprising:
monitoring, by the processing device, a conversation between participants that are using a communication system;
determining, by the processing device, a knowledge gap in the conversation between participants based at least in part on analyzing content of the conversation, wherein determining the knowledge gap comprises detecting inaccurate information in the conversation;
responsive to detecting the inaccurate information, selecting, by the processing device, a recommended participant to add to the conversation, the recommended participant being selected based at least in part on the inaccurate information;
responsive to sending a notification to the recommended participant to query whether the recommended participant elects to participate in the conversation or elects to not participate in the conversation, receiving, by the processing device, an election from the recommended participant; and
responsive to receiving the election from the recommended participant to participate in the conversation, establishing, by the processing device, a connection between the communication system and a user device associated with the recommended participant to add the recommended participant to the conversation,
wherein the recommended participant is a virtual participant, the method further comprising:
removing, by the processing device, the virtual participant from the conversation responsive to receiving a request from one or more of the participants to remove the virtual participant from the conversation.

14. The computer program product of claim 13, wherein the recommended participant is selected from a plurality of potential participants.

15. The computer program product of claim 14, wherein each potential participant of the plurality of potential participants has an existing relationship with at least one of the participants.

16. The computer program product of claim 13, wherein the method further comprises:
prior to adding the recommended participant to the conversation, presenting an authorization option to the participants to enable the participants to select whether to add the recommended participant to the conversation; and subsequent to at least one of the participants selecting to add the recommended participant to the conversation, adding the recommended participant to the conversation via the communication system.

17. The computer program product of claim 13, wherein the method further comprises, subsequent to adding the recommended participant to the conversation:

monitoring, by the processing device, the conversation between participants and the recommended participant using the communication system;

determining, by the processing device, a second knowledge gap in the conversation between participants and the recommended participant based at least in part on analyzing the content of the conversation;

selecting, by the processing device, a second recommended participant to add to the conversation, the second recommended participant being selected based at least in part on the second knowledge gap; and establishing, by the processing device, a connection between the communication system and a second user device associated with the second recommended participant to add the second recommended participant to the conversation.

* * * * *